(12) United States Patent
Jun et al.

(10) Patent No.: US 10,464,528 B2
(45) Date of Patent: Nov. 5, 2019

(54) SYSTEM FOR PROTECTING COMMUNICATION BETWEEN VEHICLE AND SMART KEY AND CONTROL METHOD THEREOF

(71) Applicants: HYUNDAI MOTOR COMPANY, Seoul (KR); KIA MOTORS CORPORATION, Seoul (KR)

(72) Inventors: SungHwan Jun, Hwaseong-si (KR); Young Seop Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/994,257

(22) Filed: May 31, 2018

(65) Prior Publication Data

US 2019/0168713 A1    Jun. 6, 2019

(30) Foreign Application Priority Data

Dec. 5, 2017    (KR) .................... 10-2017-0165616

(51) Int. Cl.
*B60R 25/24*    (2013.01)
*G07C 9/00*    (2006.01)

(52) U.S. Cl.
CPC .......... *B60R 25/241* (2013.01); *B60R 25/246* (2013.01); *G07C 9/00309* (2013.01)

(58) Field of Classification Search
None
See application file for complete search history.

(56) References Cited

U.S. PATENT DOCUMENTS

| | | | | |
|---|---|---|---|---|
| 7,425,886 B2 * | 9/2008 | Yoshii | ..................... | B60R 25/24 340/5.2 |
| 7,778,186 B2 * | 8/2010 | Oman | ..................... | G07C 5/008 340/12.53 |
| 8,847,731 B2 * | 9/2014 | Tieman | ................... | B60R 25/24 340/425.5 |
| 9,751,497 B2 * | 9/2017 | Sanji | ....................... | B60R 25/24 |

FOREIGN PATENT DOCUMENTS

| KR | 2016-0056495 A | 5/2016 |
|---|---|---|
| KR | 10-2017-0059989 A | 5/2017 |

* cited by examiner

*Primary Examiner* — K. Wong
(74) *Attorney, Agent, or Firm* — Morgan, Lewis & Bockius LLP

(57) ABSTRACT

A vehicle includes: a communicator configured to transmit security data to a smart key and configured to receive response data from the smart key based on the security data; and a controller configured to determine whether the smart key matches the vehicle based on the response data, and configured to unlock the vehicle when it is determined that the smart key matches the vehicle.

16 Claims, 12 Drawing Sheets

SYSTEM FOR PROTECTING COMMUNICATION BETWEEN VEHICLE AND SMART KEY AND CONTROL METHOD THEREOF

CROSS-REFERENCE TO RELATED APPLICATION(S)

This application is based on and claims priority under 35 U.S.C. § 119 to Korean Patent Application No. 10-2017-0165616, filed on Dec. 5, 2017, in the Korean Intellectual Property Office, the disclosure of which is incorporated by reference herein in its entirety.

TECHNICAL FIELD

The present disclosure relates to a vehicle using a smart key and a control method thereof.

BACKGROUND

In a conventional technology, a smart key is implemented in a logical structure in which when a driver presses a door open button of the vehicle smart key (radio frequency (RF) simplex communication), a smart key controller receives a corresponding RF signal and performs a necessary operation while opening a door. A vehicle is configured to identify a position of smart key in the indoor/the outdoor by communicating with a low frequency (LF) module in a range in the vicinity of the vehicle or the indoor of the vehicle.

In the conventional smart key technology, since the RF communication is performed using simplex communication, security of the smart key is vulnerable to hacking, particularly when a hacking module acquires/copies and re-transmit the RF signal of the smart key in the middle of the RF communication, the smart key controller of the vehicle is reacted to the RF signal from the hacking module and thus the door may be opened.

The importance of the technologies of protecting the vehicle from the hacking has been emerged, wherein the technology is performed by applying the encryption technology using a shared key, to an RF signal output from a smart key.

SUMMARY

An aspect of the present disclosure provides a vehicle capable of improving security of communication between a smart key and the vehicle by using a shared key, and a control method thereof.

Additional aspects of the present disclosure will be set forth in part in the description which follows and, in part, will be obvious from the description, or may be learned by practice of the present disclosure.

In accordance with an exemplary embodiment of the present disclosure, a vehicle comprises: a communicator configured to transmit security data to a smart key and configured to receive response data from the smart key based on the security data; and a controller configured to determine whether the smart key matches the vehicle based on the response data, and configured to unlock the vehicle when it is determined that the smart key matches the vehicle.

The response data may comprise a fixed constant value.

The controller may derive a user recognition signal when the controller receives the response data including the fixed constant value.

The communicator receives the response data by using a frequency in the radio frequency (RF) band.

The controller may derive authentication start information and transmits the authentication start information to the smart key when a distance between the smart key and the vehicle is equal to or less than a predetermine distance.

the controller may unlock the vehicle when the security data transmitted from the smart key, which receives the authentication start information, comprises the authentication start information and at least one first shared key corresponding to the smart key.

The authentication start information may comprise a set of numbers.

The communicator may receive the response data and transmits the security data by using a frequency in the low frequency (LF) band.

The controller may derive at least one second shared key corresponding to the smart key and transmits the at least one second shared key to the smart key when it is determined that the smart key is placed inside of the vehicle.

The response data may comprise a user recognition security key.

The controller may derive a user recognition signal when the controller receives the response data comprising the user recognition security key.

In accordance with another exemplary embodiment of the present disclosure, a control method of a vehicle comprises steps of: transmitting security data to a smart key; receiving response data from the smart key based on the security data; determining whether the smart key matches the vehicle based on the response data; and unlocking the vehicle when it is determined that the smart key matches the vehicle.

The response data may comprise a fixed constant value.

The control method may further comprise deriving a user recognition signal when receiving the response data comprising the fixed constant value.

The reception of the response data may comprise receiving the response data by using a frequency in the radio frequency (RF) band.

The control method may further comprise deriving authentication start information when a distance between the smart key and the vehicle is equal to or less than a predetermine distance.

The determination of whether the smart key matches may comprise determining whether the security data transmitted from the smart key, which receives the authentication start information, comprises the authentication start information and at least one first shared key corresponding to the smart key, or not.

The authentication start information may comprise a set of numbers.

The transmission of the security data may comprise transmitting the security data by using a frequency in the low frequency (LF) band.

The reception of the response data may comprise receiving the response data and transmitting the security data by using a frequency in the low frequency (LF) band.

The control method may further comprise deriving at least one second shared key corresponding to the smart key and transmitting the at least one second shared key to the smart key when it is determined that the smart key is placed inside of the vehicle.

The response data may comprise a user recognition security key.

The control method may further comprise deriving a user recognition signal when receiving the response data comprising the user recognition security key.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
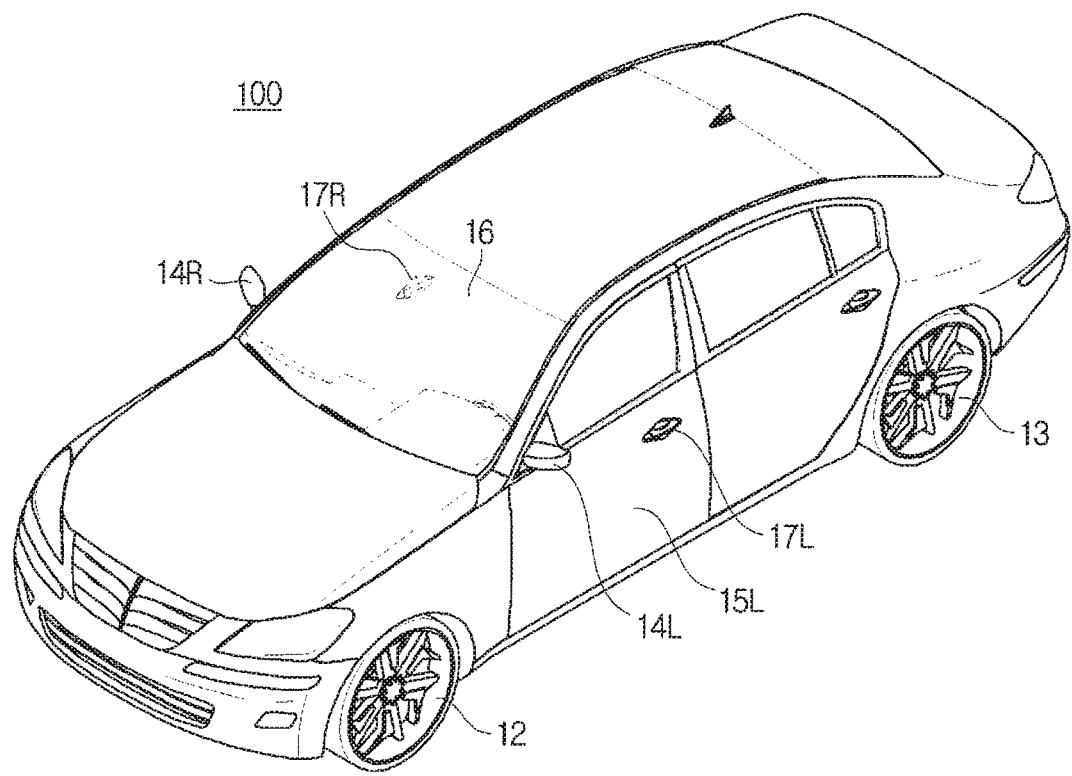
FIG. 1 is an external view of a vehicle according to an embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

When a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

FIG. 1 is an external view of a vehicle according to an embodiment of the present disclosure.

Referring to FIG. 1, according to an embodiment, an exterior of a vehicle 100 may include vehicle wheels 12 and 13 moving the vehicle 100, doors 15L and 15R closing the inside of the vehicle 100 from the outside, a front glass 16 providing a front view of the vehicle 100 to a driver inside the vehicle 100, a rear glass providing a rear view of the vehicle 100, and side mirrors 14L and 14R providing a view of a rear side of the vehicle 100 to the driver.

The vehicle wheels 12 and 13 may include a front wheel 12 provided on a front of the vehicle 100 and a rear wheel 13 provided on a rear of the vehicle 100. A driving device (not shown) provided inside of the vehicle 100 may supply a torque to the front wheel 12 and the rear wheel 13 so that the vehicle 100 may be moved forward and backward. The driving device may employ an engine configured to generate a torque by burning fossil fuel or a motor configured to generate a torque by receiving power source from a capacitor.

The doors 15L and 15R (refer to FIG. 2) may be rotatably provided on a right side and a left side of the vehicle 100. When the door is opened, the driver may be allowed to be seated in the vehicle 100, and when the door is closed, the inside of the vehicle 100 may be closed from the outside. Handles 17L and 17R configured to open and close the doors 15L and 15R, respectively, may be provided in the outside of the vehicle 100, wherein low frequency (LF) antennas 111a and 111c (refer to FIG. 3) configured to receive a low frequency signal may be provided in the handles 17L and 17R.

When the authentication is completed between a smart key 200 (refer to FIG. 3) and the vehicle 100 via the wireless communication network, a door lock of the vehicle 100 may be released, and thus, when a user pulls the handles 17L and 17R, the doors 15L and 15R may be opened.

The front glass 16 may be provided on an upper portion of the front of a vehicle body to allow the driver inside the vehicle 100 to acquire visual information about the front of the vehicle 100 and may be referred to as "windshield glass".

The side mirrors 14R and 14L may include a left side mirror 14R provided on the left side of the vehicle 100 and a right side mirror 14L provided on the right side of the vehicle 100, and may allow the driver inside the vehicle 100 to acquire visual information of the lateral side and the rear side of the vehicle 100.

In addition, the vehicle 100 may include a detector (not shown), e. g. a proximity sensor, configured to detect an obstacle and another vehicle in the rear or lateral side, and a rain sensor configured to detect whether to rain and an amount of rain.

The proximity sensor may transmit a detection signal to the lateral side or rear side of the vehicle 100, and receive a reflection signal reflected from the obstacle such as another vehicle. Based on a waveform of the received signal, the proximity sensor may detect whether the obstacle is present in the rear or lateral side of the vehicle 100, and a position in which the obstacle is placed. As an example of such a proximity sensor, a method of transmitting ultrasound or infrared rays and detecting a distance to an obstacle by using ultrasound waves or infrared rays reflected by obstacles may be employed.

Figure 2:
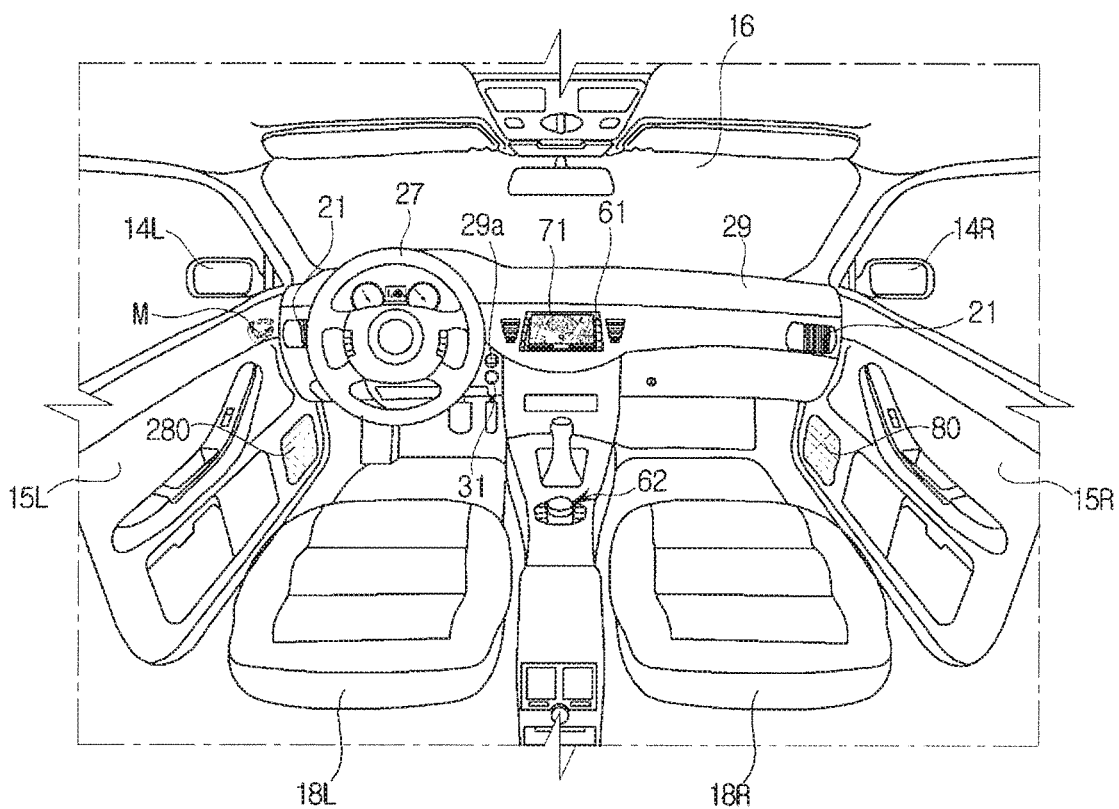
FIG. 2 is a view illustrating an internal appearance of the vehicle according to an embodiment of the present disclosure.

FIG. 2 is a view illustrating an internal appearance of the vehicle according to an embodiment of the present disclosure.

Referring to FIG. 2, in the center area of a dashboard 29, an audio video navigation terminal (AVN) display 71 and an AVN input 61 may be provided. The AVN display 71 may selectively display at least one of an audio screen, a video screen, and a navigation screen, as well as a screen related to various control screens or additional functions related to the vehicle 100.

The AVN display 71 may be implemented by a LCD (Liquid Crystal Display), a LED (Light Emitting Diode), a PDP (Plasma Display Panel), an OLED (Organic Light Emitting Diode), or a CRT (Cathode Ray Tube).

The AVN input 61 may be provided in a hard key type on an area adjacent to the AVN display 71. Alternatively, when the AVN display 71 is implemented by a touch screen, the AVN input 61 may be provided as a touch panel type on the front surface of the AVN display 71.

A jog shuttle center input 62 may be provided between a driver seat 18L and a passenger seat 18R. A user may input a control command by rotating, pressing the center input 62 or pushing the center input 62 in the up, down, left, or right direction.

The vehicle 100 may include a sound output portion 80 configured to output a sound, the sound output portion 80 may be a speaker. The sound output portion 80 may output a necessary sound to perform an audio function, a video function, a navigation function and other additional functions.

On the dashboard 29 in the side of the driver seat 18L, a steering wheel 27 may be provided. A key hole 29a to which the smart key 200 (refer to FIG. 3), e.g., a FOB key, is inserted, may be provided adjacent to the steering wheel 27. When the smart key 200 is inserted into the key hole 29a or when the authentication between the smart key 200 and the vehicle 100 is completed via the wireless communication network, the smart key 200 may be connected to the vehicle 100.

On the dashboard 29, an ignition button 31 configured to control of turning on and off of the vehicle 100 may be provided. When the smart key 200 is inserted into the key hole 29a or when the authentication between the smart key 200 and the vehicle 100 is successful through a wireless communication network, it may be possible to start the ignition of the vehicle 100 by pressing the ignition button 31 by a user.

An air conditioning apparatus (not shown) may be provided in the vehicle 100 and thus heating and cooling may be performed. The air conditioning apparatus may control an internal temperature of the vehicle 100 by discharging heated or cooled air through an air outlet 21.

In the vehicle 100, an integrated memory system (IMS) may be provided, wherein the IMS is performed such that for each driver, a position of the seat, the mirror, and the steering wheel, which suits a driver's body, is designated and stored in a memory button and thus when the position of the back mirror and the steering wheel is not fitted to the driver since another driver used the vehicle, it may be possible to automatically adjust the seat, the back mirror and the steering wheel to the position for the driver at once by pressing the memory button.

Figure 3:
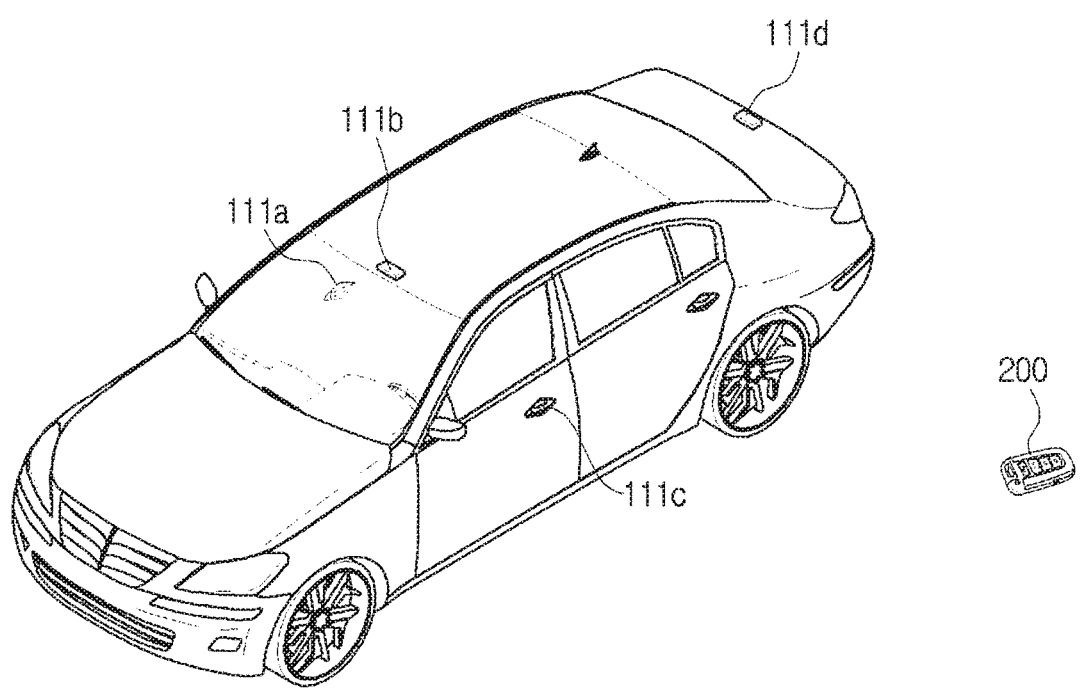
FIG. 3 is a view illustrating a smart key performing a communication with the vehicle according to an embodiment of the present disclosure.

FIG. 3 is a view illustrating a smart key performing a communication with the vehicle according to an embodiment of the present disclosure.

The smart key 200 may be connected to the vehicle 100 through transmission and reception of wired or wireless signals.

As illustrated in FIG. 3, the smart key 200 may be a FOB key that is connected to the vehicle 100 by a wired or a wireless communication, and configured to unlock the door and configured to allow the ignition and the driving of the vehicle 100.

According to an embodiment as illustrated in FIG. 3, the smart key 200 may include all kinds of input devices configured to control the vehicle 100 so that the door lock is released and the ignition and the driving are available, other than the FOB key. For example, when a mobile device acts as a smart key, it is also possible that the smart key 200 includes a mobile device. In this case, an application configured to execute an operation corresponding to the smart key 200 may be installed in the mobile device, wherein the mobile device may be sold after the application is installed therein or a user may download the application from a server after purchasing the mobile device. In order that the mobile device operates as the smart key 200 for the vehicle 100, the mobile device may go through the authentication procedure.

The smart key 200 may be sold with the vehicle 100, wherein authentication information may be pre-stored in the smart key 200 for the connection with the vehicle 100.

The smart key 200 and the vehicle 100 may transmit and receive a signal through a low frequency (LF) communication network and a radio frequency (RF) communication network, so as to perform the mutual authentication procedure.

The LF communication network represents a communication network in a low frequency band, which is used for the vehicle 100 to transmit and receive an LF signal for scanning or authenticating the smart key 200, wherein the LF communication network may have a frequency band of from 120 kHz or more to 135 kHz or less. When transmitting and receiving the LF signal through the LF communication network, due to the characteristic of the LF band, a transmission and reception distance of the signal may be less than a transmission and reception distance of the signal in the RF communication network having a high-frequency band. For example, the transmission and reception distance of the LF signal may be approximately 12 m and the transmission and reception distance of the RF signal may be approximately 100 m.

Therefore, the vehicle 100 may request the information necessary for authentication of the smart key 200 adjacent to the vehicle 100 by transmitting the LF signal through the LF communication network.

In order to transmit an LF signal, the vehicle 100 may include an LF communication portion, wherein the LF communication portion 111 may include at least one LF antenna 111a to 111d.

Each LF antenna 111a to 111d may be provided on the front, rear, side, or inside of the body of the vehicle 100 and transmit the LF signal at various angles and intensities. According to the position of the LF antennas 111a to 111d, the LF signal reception intensity and reception direction of the smart key 200 described later may be different.

Hereinafter, the LF antenna 111a provided in the handle 17R of the door 15R, the LF antenna 111c provided in the handle 17L of the door 15L, the LF antenna 111b provided in an upper end portion of the vehicle body, and the LF antenna 111d provided in the trunk will be described as an example, but the position of the LF antenna is not limited thereto.

When the vehicle 100 transmits an LF signal through the LF antennas 111a to 111d, the smart key 200 may receive the LF signals of the respective LF antennas 111a to 111d.

Reception intensity of the LF signal and a reception direction of the LF signal received by the smart key 200 may vary according to the relative positions of the LF antennas 111a to 111d and the smart key 200.

The RF communication network represents a communication network in a high frequency band, which is used for the vehicle 100 to receive an RF signal from the smart key 200 receiving an LF signal, wherein the RF communication network may have a frequency band of from 315 MHz or more to 433 MHz or less. When transmitting and receiving an RF signal through the RF communication network, a transmission and reception distance of the signal may be greater than a transmission and reception distance of the signal in the LF communication network having a low frequency band.

When the smart key 200 is present within a transmission and reception distance of the LF signal from the vehicle 100, the smart key 200 may receive the LF signal through the LF communication network from the vehicle 100, and transmit an RF signal to the vehicle 100 through the RF communication network.

Figure 4:
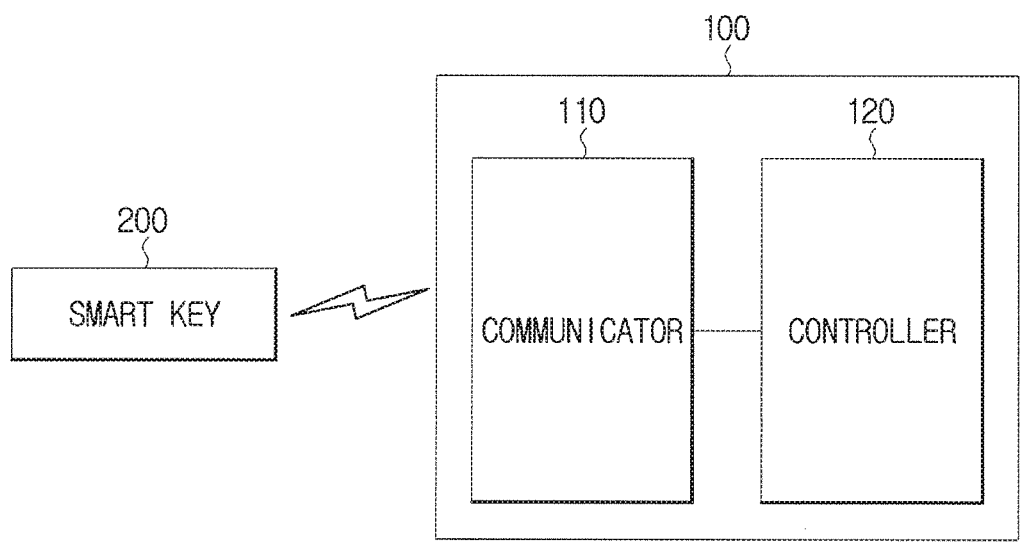
FIG. 4 is a control block diagram of the vehicle according to an embodiment of the present disclosure.

FIG. 4 is a control block diagram illustrating the vehicle according to an exemplary embodiment of the present disclosure.

According to an embodiment, the vehicle 100 may include a communicator 110 and a controller 120.

The communicator 110 may transmit security data to the smart key, and receive response data, which is formed by the smart key based on the security data, wherein the response data transmitted from the smart key may include a predetermined fixed constant value. The security data and response data may include a shared key, a fixed constant, and an arbitrary constant for the association between the vehicle 100 and the smart key, which will be described later. The arbitrary constant is a random number, and it may be composed of a set of arbitrary constants.

The communicator 110 is a hardware device capable of transmitting an analog or digital signal over wire or wirelessly and may include one or more components that enable communication with an external device. Examples of the communicator 110 include Bluetooth devices, infrared devices, modem, network card (using Ethernet), smartphone, Wi-Fi devices (using a Wi-Fi router), etc.

The communicator 110 may include one or more components configured to allow the communication with an external device, wherein the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a transmitter that transmits the security data. In addition, the wireless communication module may further include a security data conversion module for modulating a digital control signal output from the controller 120 via the wireless communication interface according to the control of the controller, into an analogy wireless signal.

The wireless communication module may include a wireless communication interface having an antenna and a receiver that receives the security data. In addition, the wireless communication module may further include a security data conversion module for demodulating a digital control signal output from the controller 120 via the wireless communication interface according to the control of the controller, into a digital control signal.

The communicator 110 may include an LF communicator transmitting an LF signal within an LF transmission distance through the LF communication network, and an RF communicator receiving an RF signal within an RF transmission and reception distance through the RF communication network.

The LF communicator may include an LF communication interface including a communication port connecting the LF communication network to the controller 120, and a transmitter transmitting the LF signal.

The LF transmitter may be implemented as an LF antenna and provided in the vehicle 100 in a plurality, wherein the LF antennas may be provided in the front, rear, side, or inside of the body and may transmit LF signals at different angles and different intensities.

The LF antenna may include the LF antenna 111*a* provided in the handle 17R of the door 15R, the LF antenna 111*c* provided in the handle 17L of the door 15L, the LF antenna 111*b* provided in an upper end portion of the body, and the LF antenna 111*d* provided in the trunk, which was described related to FIG. 3.

In addition, the LF communicator may further include an LF signal conversion module modulating a digital control signal output from the controller 120 through the LF communication interface according to control of the controller 120 to the LF signal in analog form.

The RF communicator may include an RF communication interface including a communication port connecting the RF communication network to the controller 120, and a receiver receiving the RF signal.

The RF communicator may further include an RF signal conversion module demodulating the analog RF signal received through the RF communication interface, into a digital control signal.

The control signal and the RF signal and the LF signal of the vehicle 100 may have different formats from each other.

The controller 120 may determine whether the smart key matches the vehicle 100 based on the response data, and when it is determined that the smart key matches the vehicle 100, the controller 120 may transmit response data corresponding to the response data to the smart key.

The determination of the matching between the vehicle 100 and the smart key 200 may be performed such that when the controller 120 receives the response data from the smart key 200, the controller 120 generates an arbitrary constant corresponding to the response data and transmits the arbitrary constant to the smart key 200, and the controller 120 determines whether an arbitrary number and a shared key, which are transmitted from the smart key 200 to the controller 120, coincides with the arbitrary constant and a shared key, which are transmitted from the controller 120 to the smart key 200. When it is determined that the components coincide with each other, the controller 120 may determine that the smart key 200 matches the vehicle 100, and thus, the controller 120 may unlock the vehicle 100.

When the controller 120 receives the response data including an arbitrary fixed constant, the controller 120 may derive a user recognition signal. The arbitrary fixed constant corresponds to a basic value of the arbitrary constant, and when a fixed constant value is contained in the signal transmitted from the smart key 200, the controller 120 may derive a user recognition signal. The user recognition signal corresponds to "welcome signal", and the user recognition signal may be provided with a signal indicating that a user approaches the vehicle 100.

When a distance between the vehicle 100 and the smart key 200 is equal to or less than a predetermine distance, the controller 120 may derive authentication start information and transmit the authentication start information to the smart key 200. The authentication start information including the above mentioned arbitrary constant corresponds to information for starting a step in which the vehicle 100 authenticates the smart key 200. When the response data transmitted from the smart key 200 which receives the authentication start information, includes the authentication start information and at least one first shared key corresponding to the vehicle 100, the controller 120 may unlock the vehicle 100. In other words, when the response data transmitted from the smart key 200 includes the arbitrary constant and the shared key transmitted from the controller 120, the controller 120 may authenticate the smart key 200 and determine whether the corresponding smart key 200 matches the vehicle 100. As mentioned above, the authentication start information may be a set of numbers that is arbitrarily determined.

In addition, when the smart key 200 is determined to be located in the inside of the vehicle 100, the controller 120 may derive at least one second shared key corresponding to the smart key 200, and transmit the at least one second shared key to the smart key 200. The second shared key may be transmitted from the controller 120 when the smart key 200 is placed inside of the vehicle 100 or when an ignition of the vehicle 100 is started (i.e., after the authentication between the vehicle 100 and the smart key 200 is completed) after the locking of the vehicle 100 is released through the above mentioned operation, wherein the second shared key may be different from the first shared key. In other words, when it is determined that the ignition of the vehicle 100 is started, the controller 120 may derive at least one second shared key corresponding to the smart key 200, and transmit the second shared key to the smart key 200.

The response data may include a user recognition security key. In addition, when the controller 120 receives the response data including the user recognition security key, the controller 120 may derive a user recognition signal. The controller 120 may derive the user recognition signal when the controller 120 receives the response data including the arbitrary fixed constant as mentioned above. Alternatively, the controller 120 may further generate a single shared key corresponding to a user recognition security key and then use the shared key to derive a user recognition signal.

The controller 120 may be implemented using a memory (not shown) storing an algorithm for controlling an operation of components in the vehicle 100 and data related to programs implementing the algorithm, and a processor (not shown) performing the above mentioned operation using the data stored in the memory. The memory and the processor may be implemented in separate chips, or a single chip. The controller 120 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto.

In the present disclosure, the controller 120 may be an electronic control unit (ECU) in which the communicator 110 may be hardware devices and may be connected as separate devices or embedded in the controller 120.

In response to the performance of the components of the vehicle 100 illustrated in FIG. 4, at least one component is added to or deleted. It will be readily understood by those skilled in the art that the mutual position of the components can be changed corresponding to the performance or structure of the system.

Each of the components shown in FIG. 4 refers to software and/or hardware components such a Field Programmable Gate Array (FPGA) and an Application Specific Integrated Circuit (ASIC).

Figure 5:
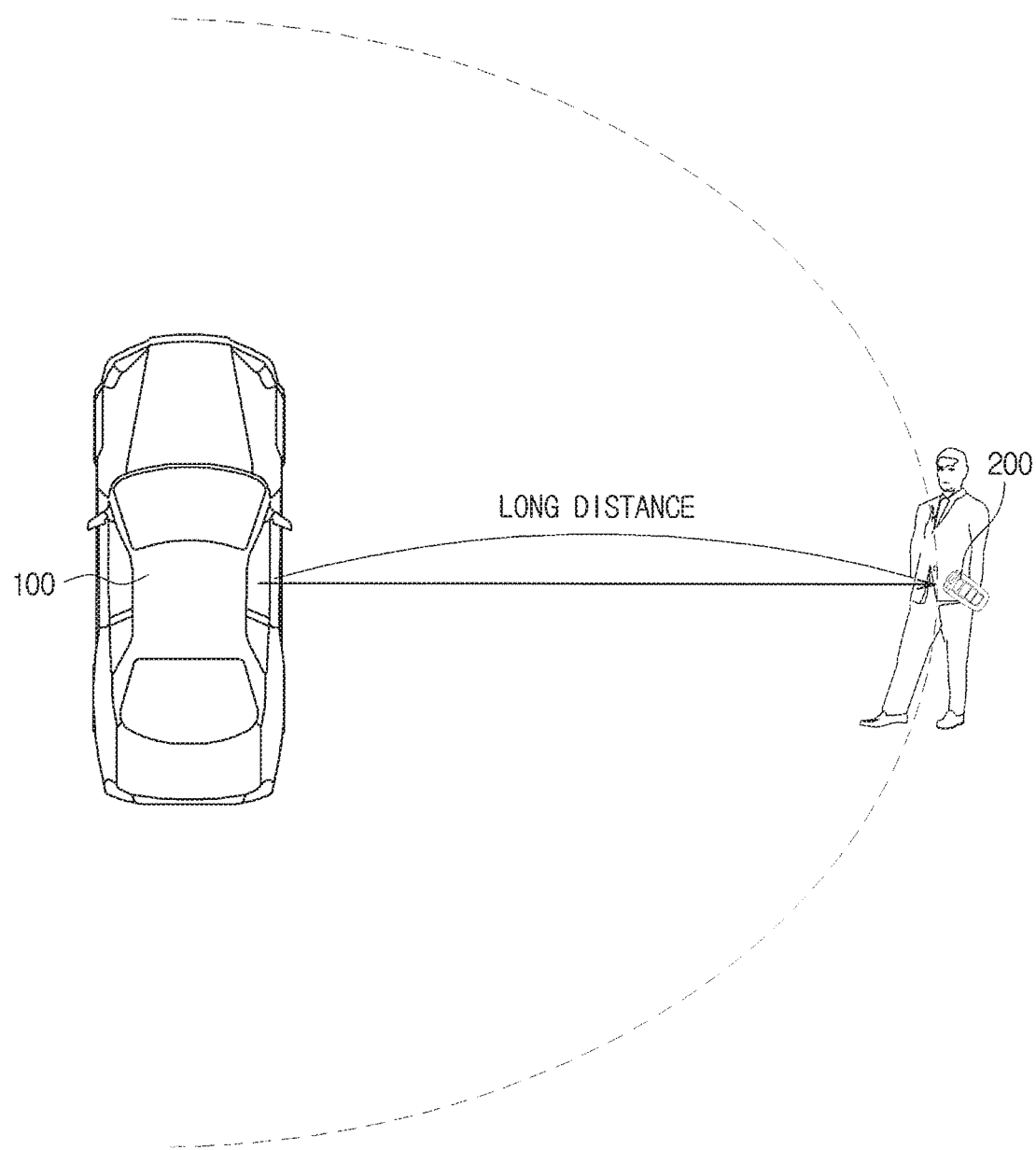
FIGS. 5 to 7 are views illustrating a distance between the smart key and the vehicle according to an embodiment of the present disclosure.
Figure 6:
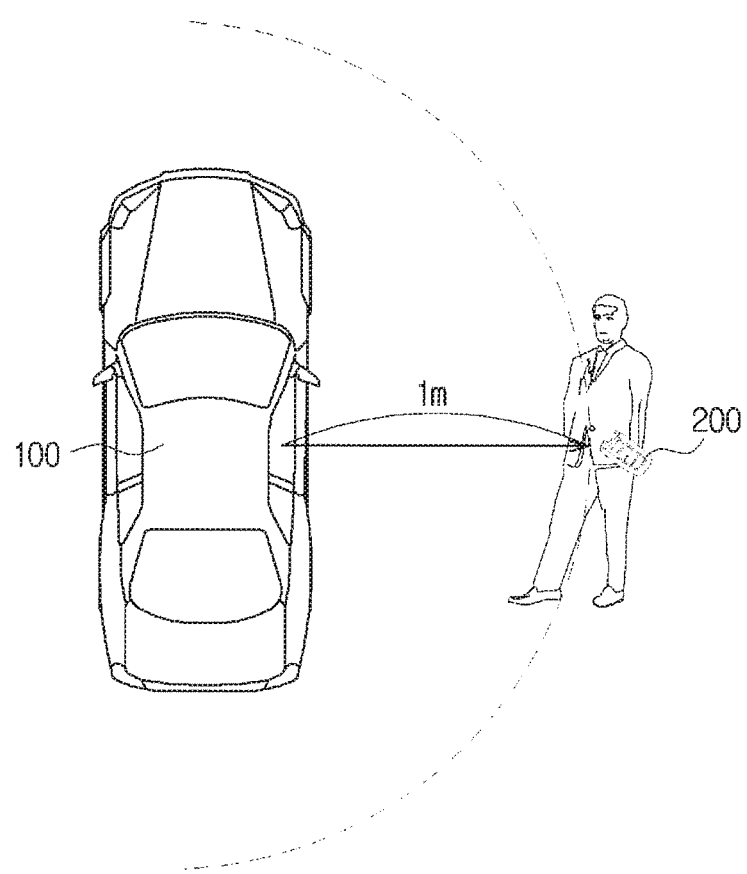
Figure 7:
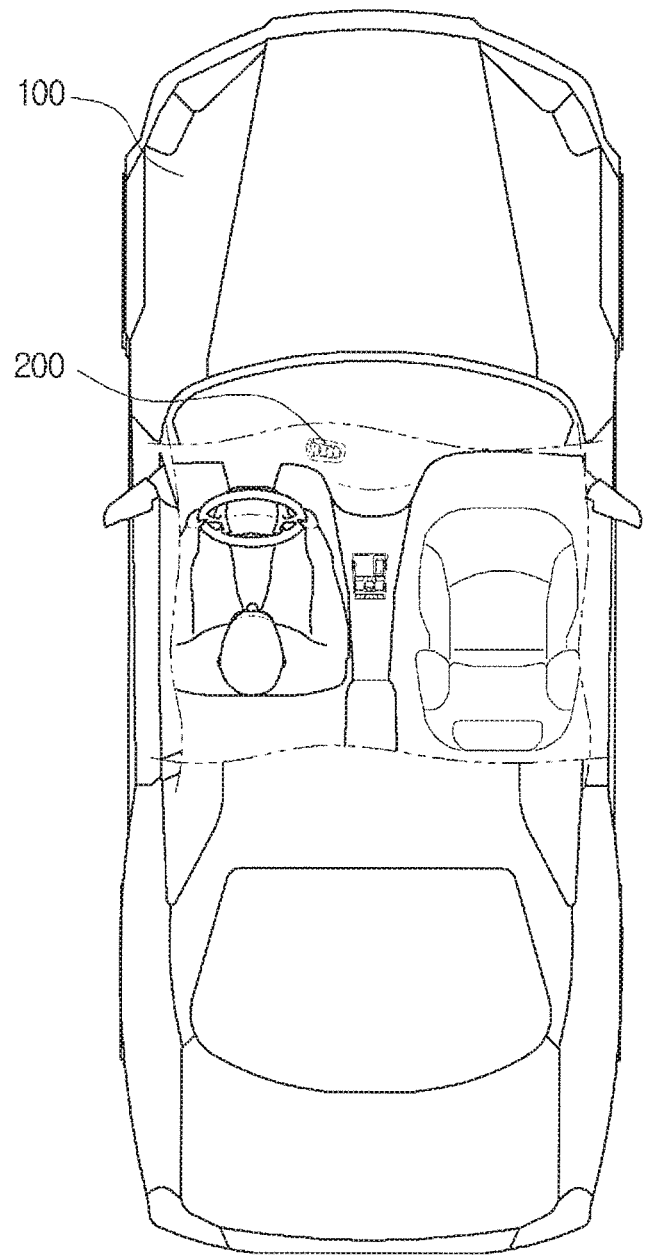

FIGS. 5 to 7 are views illustrating a distance between the smart key 200 and the vehicle 100 according to an embodiment of the present disclosure.

The contents shown in FIGS. 5 to 7 are divided into a data encryption method in the external communication state of the vehicle 100 and a shared key value update method in the internal communication state of the vehicle 100.

FIG. 5 illustrates that the smart key and the vehicle 100 are apart from each other by a predetermined distance or more.

Until the smart key 200 is adjacent to the vehicle 100 and then receives authentication start information of the vehicle 100, the smart key may transmit response data, which is encrypted as a shared key by always applying a fixed constant value to arbitrary constant data region, to the controller 120.

The response data transmitted from the smart key may include a predetermined fixed constant value, and when the controller 120 receives the response data including the arbitrary fixed constant, the controller 120 may derive a user recognition signal. The user recognition signal may be configured as "welcome signal" indicating that a user approaches the vehicle, which is different from a signal configured to release the locking of the vehicle 100.

In order to implement the operation shown in FIG. 5, it may be possible to transmit and receive data between the vehicle 100 and the smart key 200 by using a frequency in the radio frequency band.

FIG. 6 illustrates that the smart key approaches the vehicle 100 at a predetermined distance or less.

The vehicle 100 may detect a distance from the smart key 200 and determine a position in which a user is expected to unlock the vehicle 100 and to board on the vehicle 100.

When the vehicle 100 starts the operation to determine a position of a key of the vehicle 100 as the smart key 200 is close to the vehicle 100, and when it is determined that the smart key 200 is in the vicinity, the controller 120 may generate authentication start information and transmit the authentication start information to the smart key 200.

The smart key 200 may store the received authentication start information and perform the encryption as a shared key with the data and transmit the shared key to the smart key 200. The controller 120 may decrypt the received signal and identify whether to coincide with an arbitrary constant contained in the response data, thereby unlocking the vehicle 100.

Meanwhile, in order to implement the operation shown in FIG. 6, it may be possible to transmit and receive data between the vehicle 100 and the smart key 200 by using a frequency in the low frequency band.

FIG. 7 illustrates that the smart key is located inside the vehicle 100. A user may board on the vehicle 100 through the process as shown in FIG. 6. In this case, the smart key 200 may be placed inside of the vehicle 100. In addition, when a user uses the vehicle 100 normally, the user may start the ignition of the vehicle 100. When the vehicle 100 is in the ignition state, the controller 120 may generate a new shared key and update the shared key after transmitting ignition information through the internal communication of the vehicle 100. In other words, a shared key, which is newly generated and different from the shared key configured to unlock the vehicle 100 as illustrated in FIG. 6, may be transmitted to the smart key 200 and the smart key 200 may receive the new shared key and update the shared key. The controller 120 may be configured to generate a random number and shared key value with data by using a random number generator (RNG).

The operation illustrated in FIGS. 5 to 7 are merely examples for describing the operation of the present disclosure, and the type and form of the data exchanged between the controller 120 and the smart key are not limited thereto.

Figure 8:
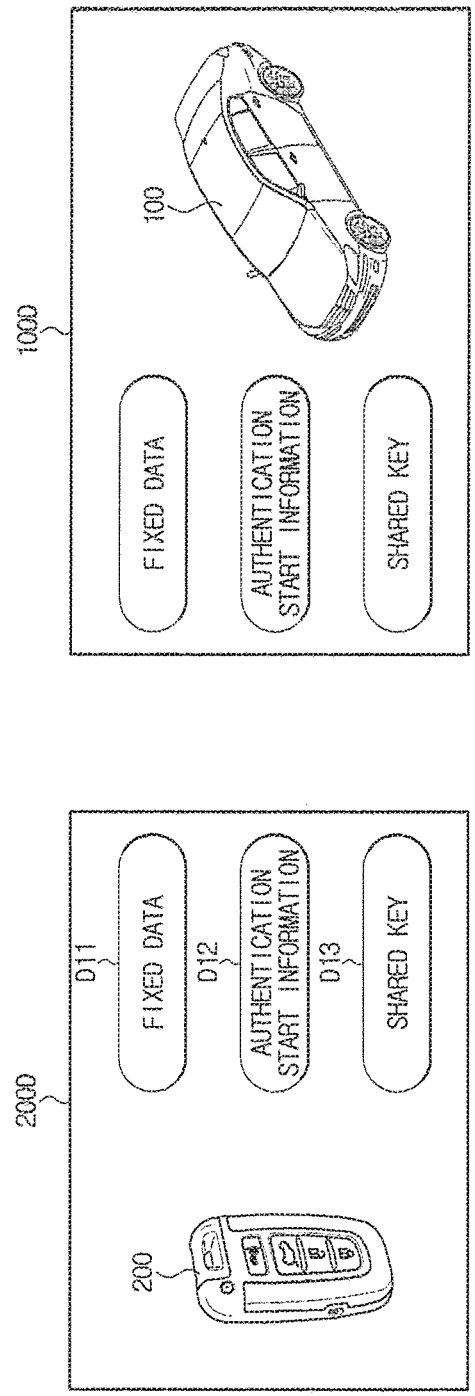
FIGS. 8 and 9 are diagrams illustrating data structures according to an embodiment.
Figure 9:
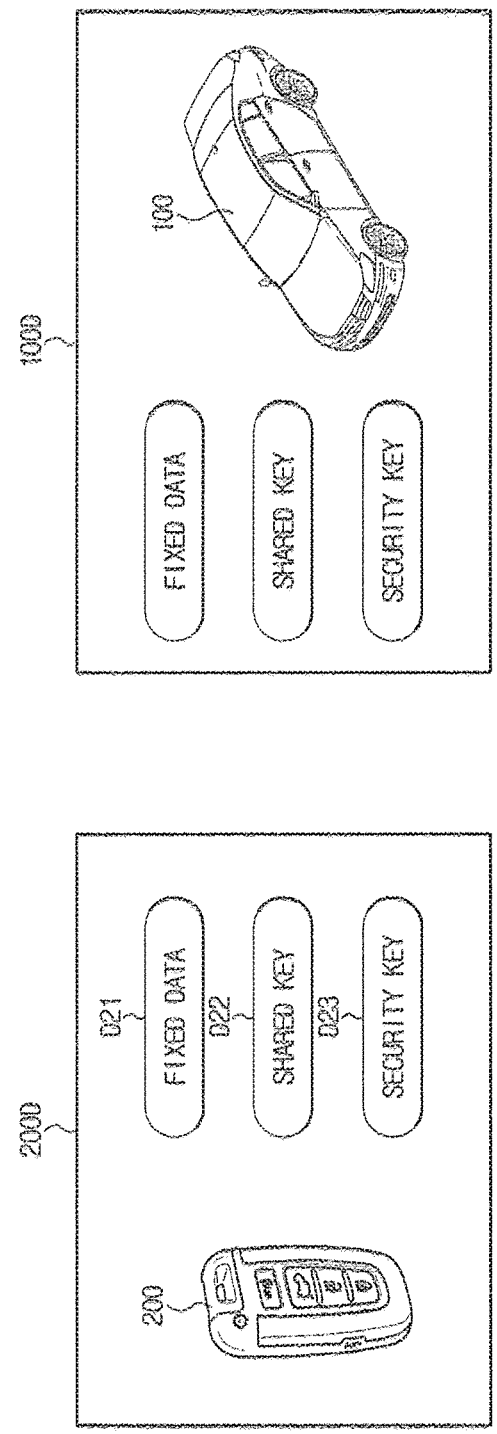

FIGS. 8 and 9 are diagrams illustrating data structures according to an embodiment of the present disclosure.

FIG. 8 illustrates security data 100D and response data 200D exchanged between the smart key and the controller 120 of the vehicle 100. The security data and the response data may be formed in the same format. The data transmitted by the smart key represents response data, and the data, which is derived by the controller 120 of the vehicle 100 and transmitted by the communicator 110 of the vehicle 100, represents security data.

Each of the data may include fixed data D11, authentication start information D12 and a shared key D13. The fixed data D11 may be basically needed information for the control between the smart key and the vehicle 100. The authentication start information D12 may be information needed for linking the vehicle 100 and the smart key as described above, wherein the authentication start information D12 may include an arbitrary constant value. Together with the shared key D13, the authentication start information D12 may be used to authenticate the vehicle 100 and the smart key. The detailed operation, in which the vehicle 100 authenticates the smart key as mentioned above, was described and thus it will be omitted.

FIG. 9 illustrates security data and response data to which a component acting as the shared key in FIG. 8 is added.

Referring to FIG. 9, the security data and the response data may further include a security key D23 instead of the authentication start information. In a case of FIG. 8, it may be possible to output user recognition information when an arbitrary fixed constant is contained in the authentication start information, since a security key is not present. However, FIG. 9 illustrates a data structure in which a single security key D23 is further provided for outputting the user recognition signal.

In other words, the existing shared key may be used to unlock the vehicle 100, and the security key may be used for outputting the user recognition signal. The controller 120 may perform decryption twice and thus decrypt the signal received from the smart key 200 as a shared key and a user authentication security key D23. The controller 120 may determine that data is decrypted to which data. FIG. 9 illustrates that a piece of information in the same format as the shared key is added, but is not limited thereto. Accordingly, there is no limitation in the number of piece of information in the same format as the shared key, which is added to the security data and the response data.

Figure 10:
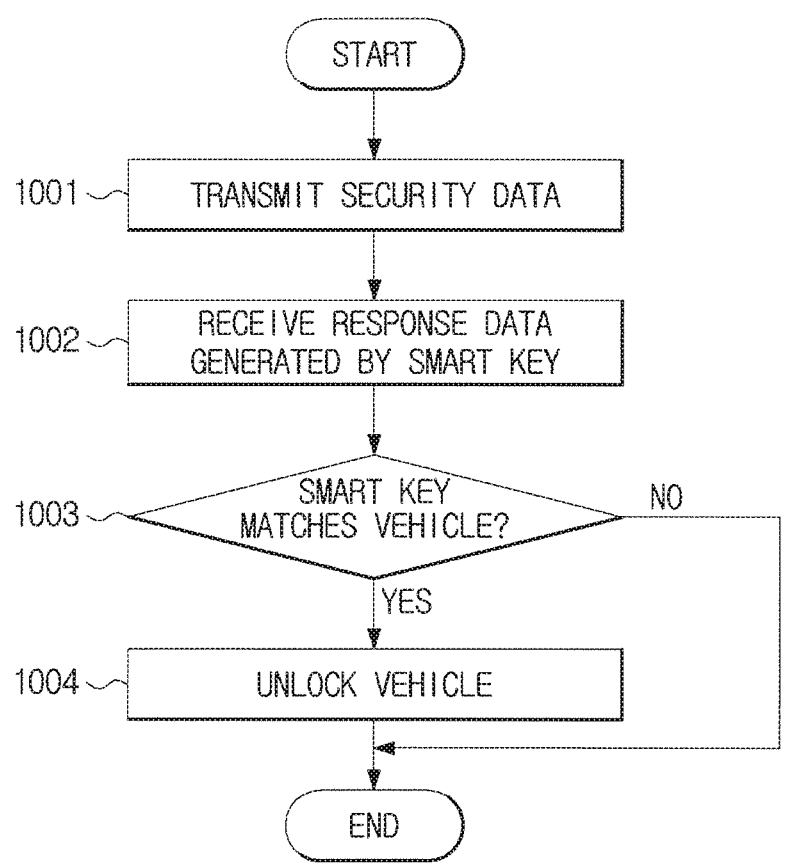
FIGS. 10 to 12 are flowcharts illustrating a method of controlling the vehicle according to an embodiment of the present disclosure.
Figure 11:
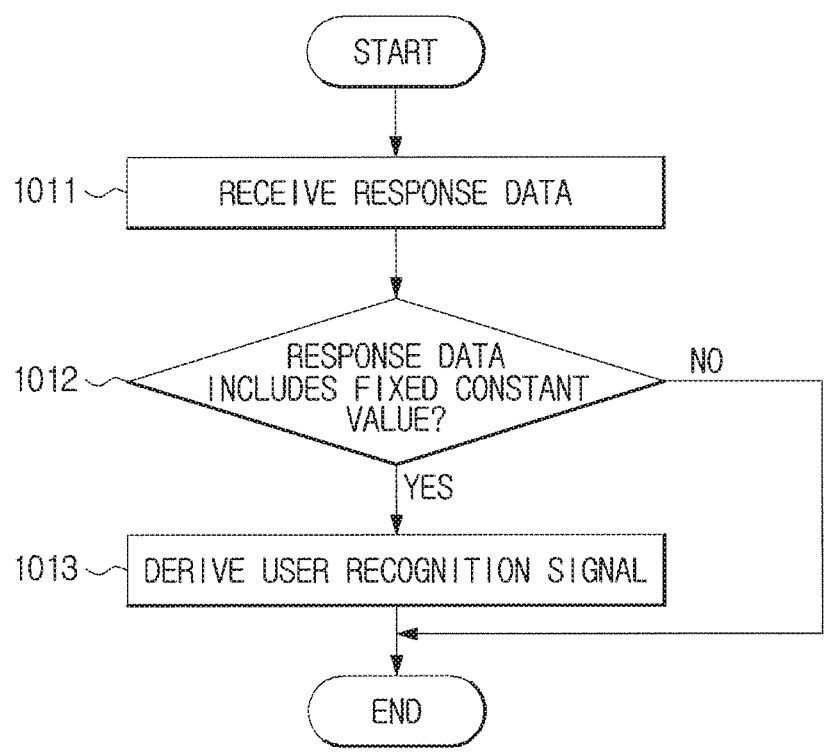
Figure 12:
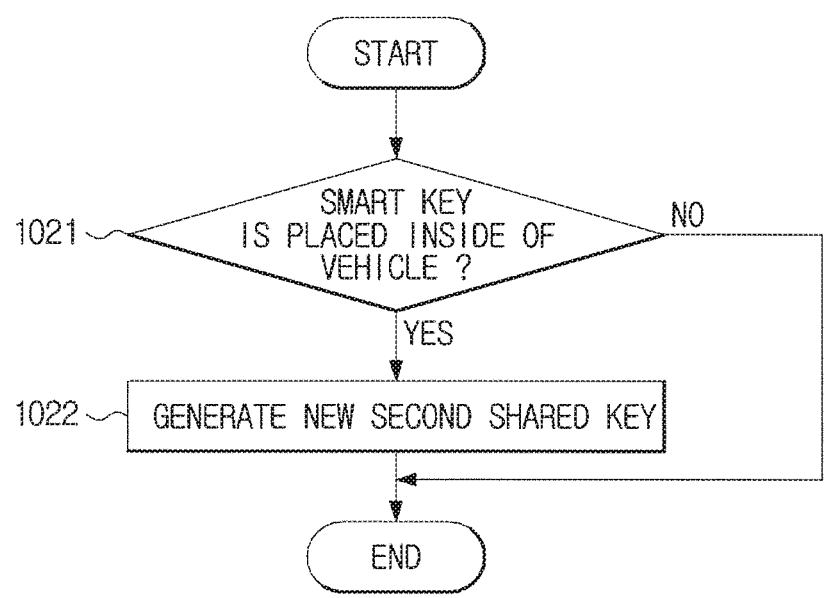

FIGS. 10 to 12 are flowcharts illustrating a method of controlling the vehicle according to an embodiment of the present disclosure.

Referring to FIG. 10, the vehicle 100 may transmit security data (1001). The smart key may receive the security data, derive new response data and transmit the new response data to the vehicle 100 and the vehicle 100 may receive the new response data (1002). The vehicle 100 may determine whether the smart key 200 matches the vehicle 100 or not based on the data (1003). When it is determined that the smart key 200 matches the vehicle 100, the vehicle 100 may unlock the vehicle 100 (1004).

FIG. 11 illustrates a flow chart of a case in which a distance between the vehicle 100 and the smart key 200 is greater than a case illustrated in FIG. 10.

The vehicle 100 may receive the response data from the smart key (1011), and when the response data includes a fixed constant value (1012), the vehicle 100 may derive a user recognition signal, i.e., a welcome signal (1013).

FIG. 12 is a flowchart illustrating a case in which the smart key 200 is placed inside of the vehicle 100, wherein the operation of FIG. 10 may be preliminarily performed. When it is determined that the smart key 200 is placed inside of the vehicle 100 (1021), the controller 120 may generate a second shared key, which is different from the first shared key that is used in a case illustrated in FIG. 10.

As is apparent from the above description, the proposed vehicle and control method thereof may improve the security of the communication between the vehicle and the smart key by using the shared key.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a communicator configured to transmit security data to a smart key and configured to receive response data from the smart key based on the security data; and
   a controller configured to determine whether the smart key matches the vehicle based on the response data, and configured to unlock the vehicle when it is determined that the smart key matches the vehicle,
   wherein the response data includes a fixed constant value, and
   wherein the controller derives a user recognition signal when the controller receives the response data including the fixed constant value.

2. The vehicle of claim 1,
   wherein, the communicator receives the response data by using a frequency in a radio frequency (RF) band.

3. The vehicle of claim 1,
   wherein, when a distance between the smart key and the vehicle is equal to or less than a reference distance, the controller derives authentication start information and transmits the authentication start information to the smart key.

4. The vehicle of claim 3,
wherein, when the security data transmitted from the smart key, which receives the authentication start information and includes the authentication start information and at least one first shared key corresponding to the smart key, the controller unlocks the vehicle.

5. The vehicle of claim 3,
wherein, the authentication start information includes a set of numbers.

6. The vehicle of claim 3,
wherein, the communicator receives the response data and transmits the security data by using a frequency in a low frequency (LF) band.

7. The vehicle of claim 1,
wherein, when it is determined that the smart key is located inside the vehicle, the controller derives at least one second shared key corresponding to the smart key and transmits the at least one second shared key to the smart key.

8. The vehicle of claim 1,
wherein the response data includes a user recognition security key, and
wherein the controller derives a user recognition signal when the controller receives the response data including the user recognition security key.

9. A control method of a vehicle comprising steps of:
transmitting, by a communicator, security data to a smart key;
receiving, by the communicator, response data from the smart key based on the security data;
determining, by a controller, whether the smart key matches the vehicle based on the response data; and
unlocking, by the controller, the vehicle when it is determined that the smart key matches the vehicle,
wherein the response data includes a fixed constant value, and
wherein the control method further comprises deriving a user recognition signal when receiving the response data which includes the fixed constant value.

10. The control method of claim 9,
wherein the step of receiving the response data comprises receiving the response data by using a frequency in a radio frequency (RF) band.

11. The control method of claim 9, further comprising
deriving authentication start information when a distance between the smart key and the vehicle is equal to or less than a reference distance.

12. The control method of claim 11, wherein
the step of determining whether the smart key matches comprises determining whether the security data transmitted from the smart key, which receives the authentication start information and includes the authentication start information and at least one first shared key corresponding to the smart key, or not.

13. The control method of claim 11, wherein
the authentication start information includes a set of numbers.

14. The control method of claim 11,
wherein the step of transmitting the security data comprises transmitting the security data by using a frequency in a low frequency (LF) band, and
wherein the step of receiving the response data comprises receiving the response data and transmitting the security data by using the frequency in the low frequency (LF) band.

15. The control method of claim 9, further comprising:
when it is determined that the smart key is located inside the vehicle, deriving at least one second shared key corresponding to the smart key and transmitting the at least one second shared key to the smart key.

16. The control method of claim 9,
wherein the response data includes a user recognition security key, and
wherein the control method further comprises deriving a user recognition signal when receiving the response data comprising the user recognition security key.

* * * * *